Sept. 1, 1942.　　　N. S. CAMPBELL　　　2,294,771
STAPLE FIBER PREPARATION
Filed June 5, 1941　　　11 Sheets-Sheet 1
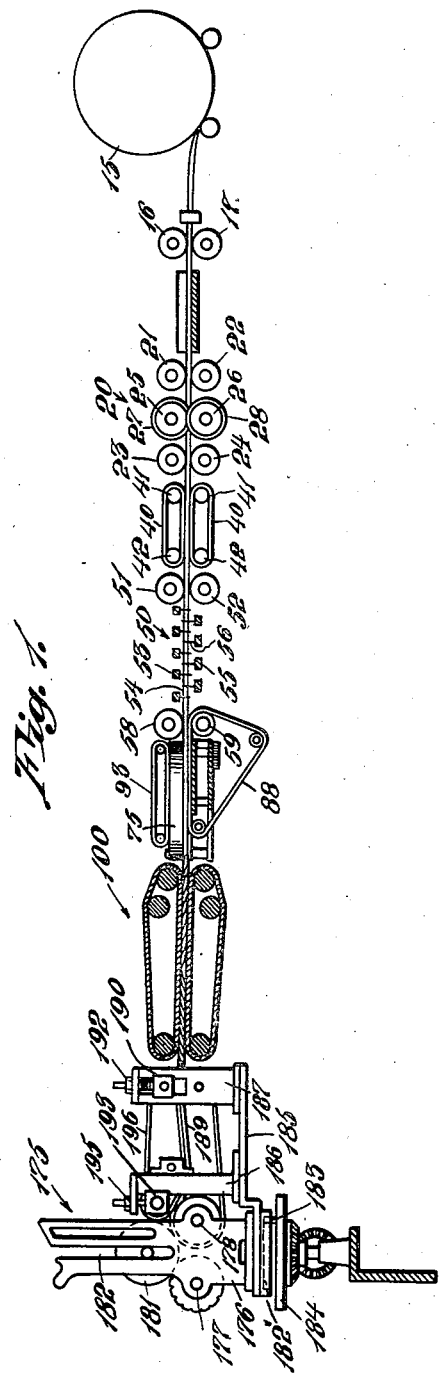
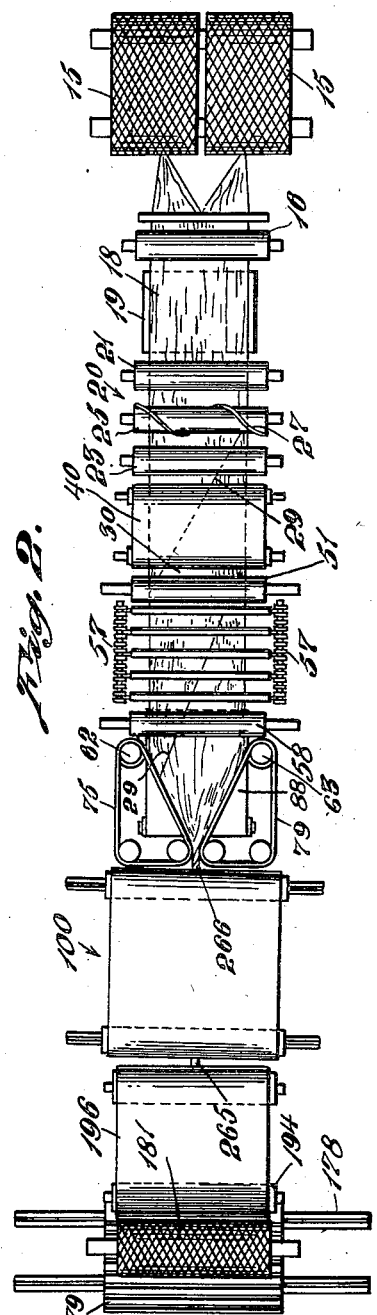
INVENTOR.
Nelson S. Campbell
BY
Barlow & Barlow
ATTORNEYS.

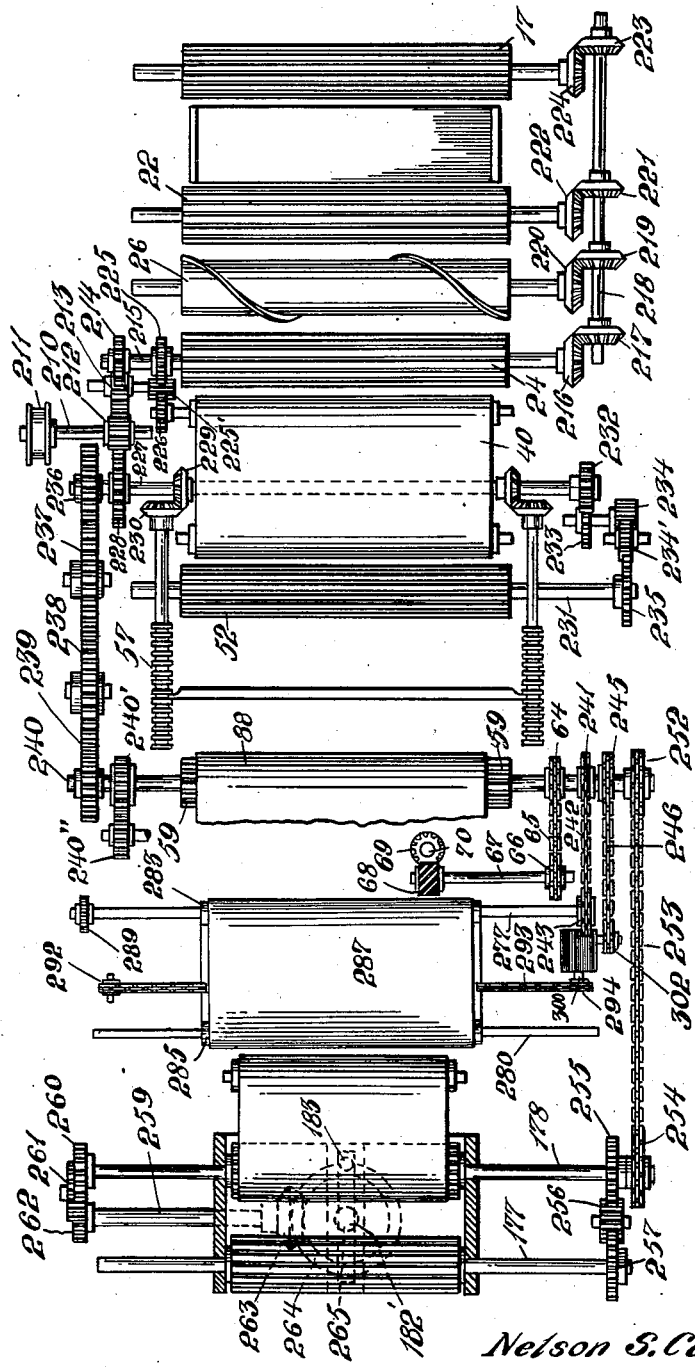

Sept. 1, 1942.   N. S. CAMPBELL   2,294,771
STAPLE FIBER PREPARATION
Filed June 5, 1941   11 Sheets-Sheet 3

INVENTOR.
Nelson S. Campbell
BY Barlow & Barlow
ATTORNEYS.

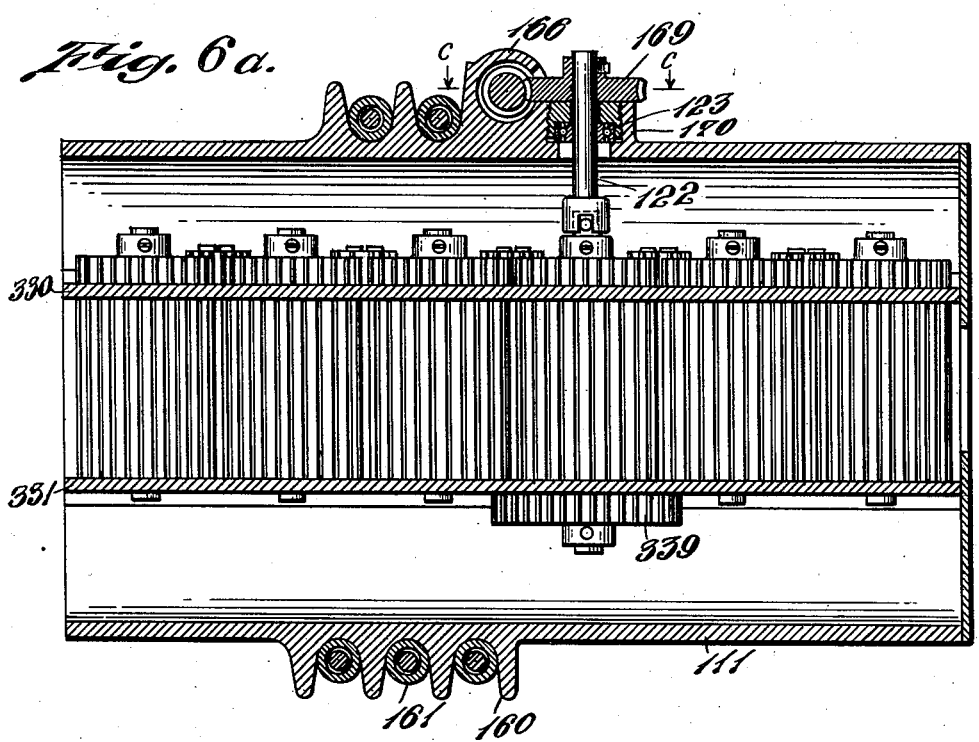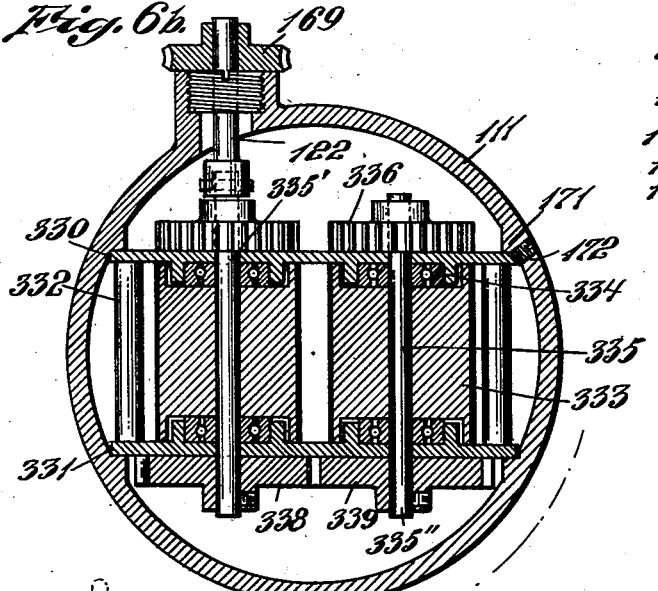

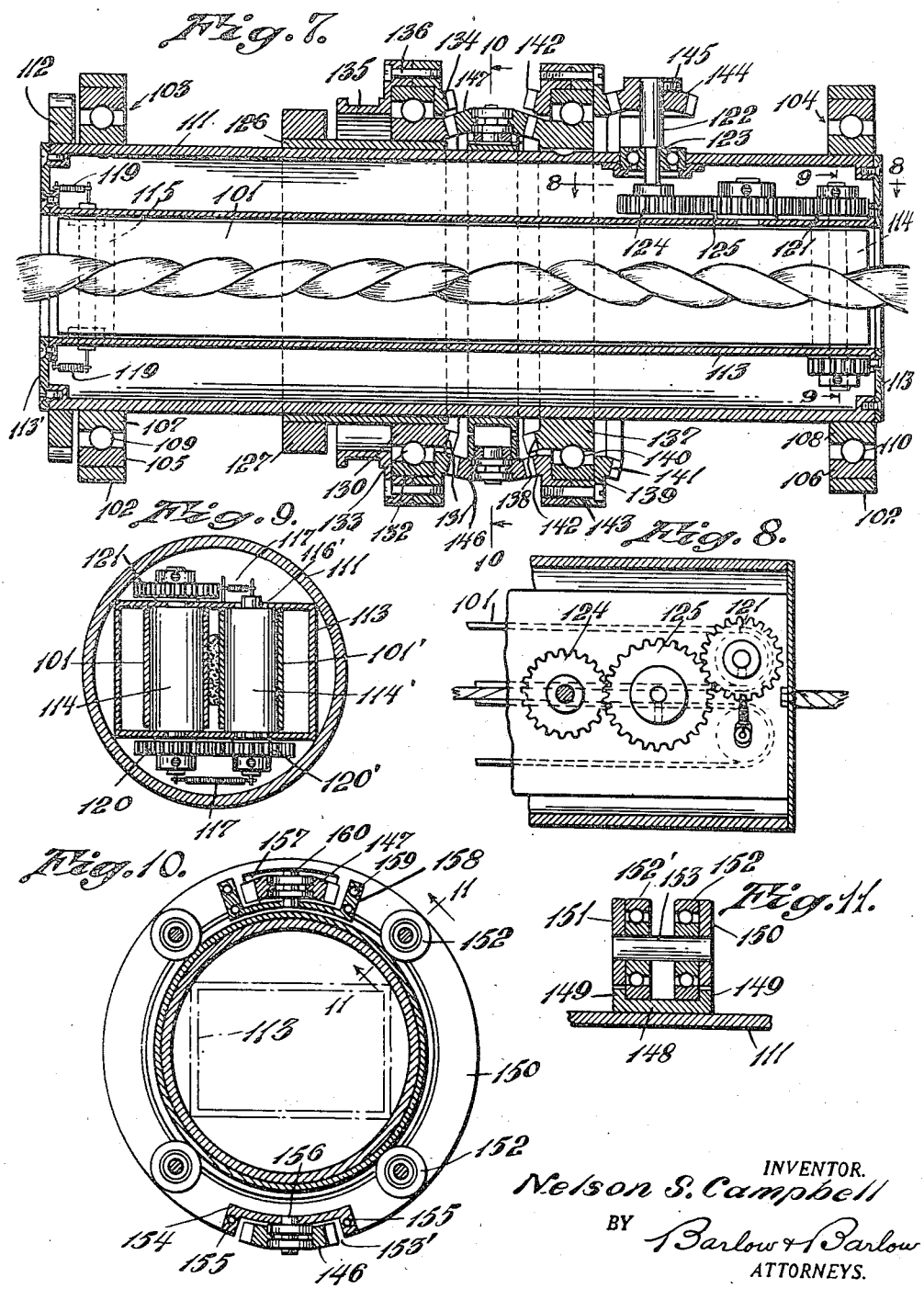

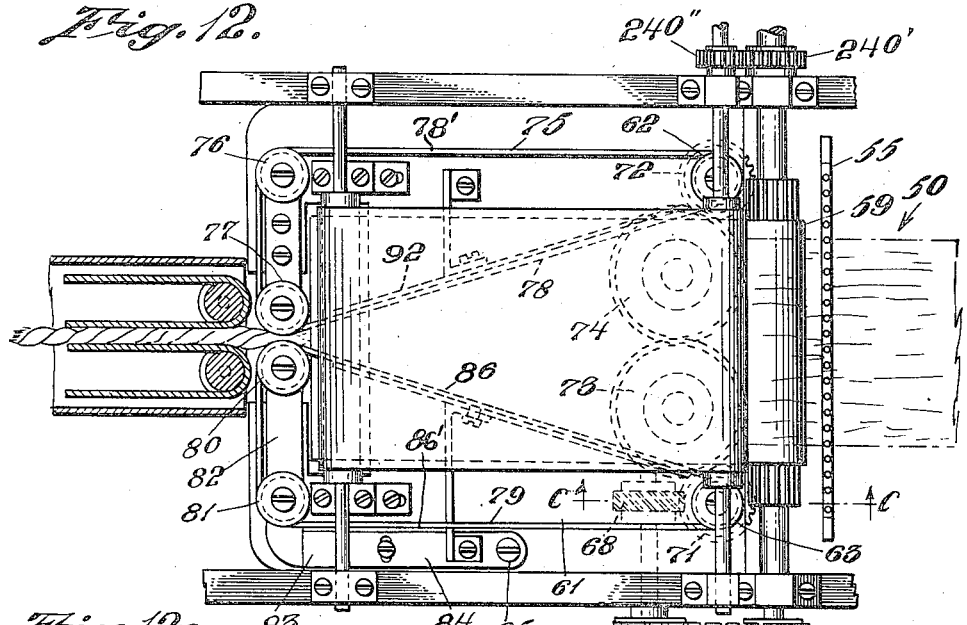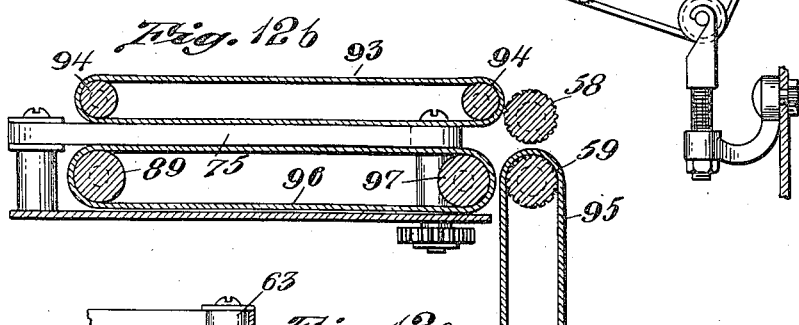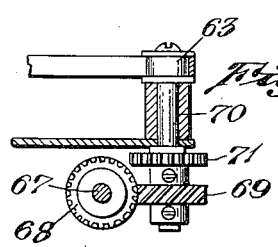

Sept. 1, 1942.  N. S. CAMPBELL  2,294,771
STAPLE FIBER PREPARATION
Filed June 5, 1941  11 Sheets-Sheet 7
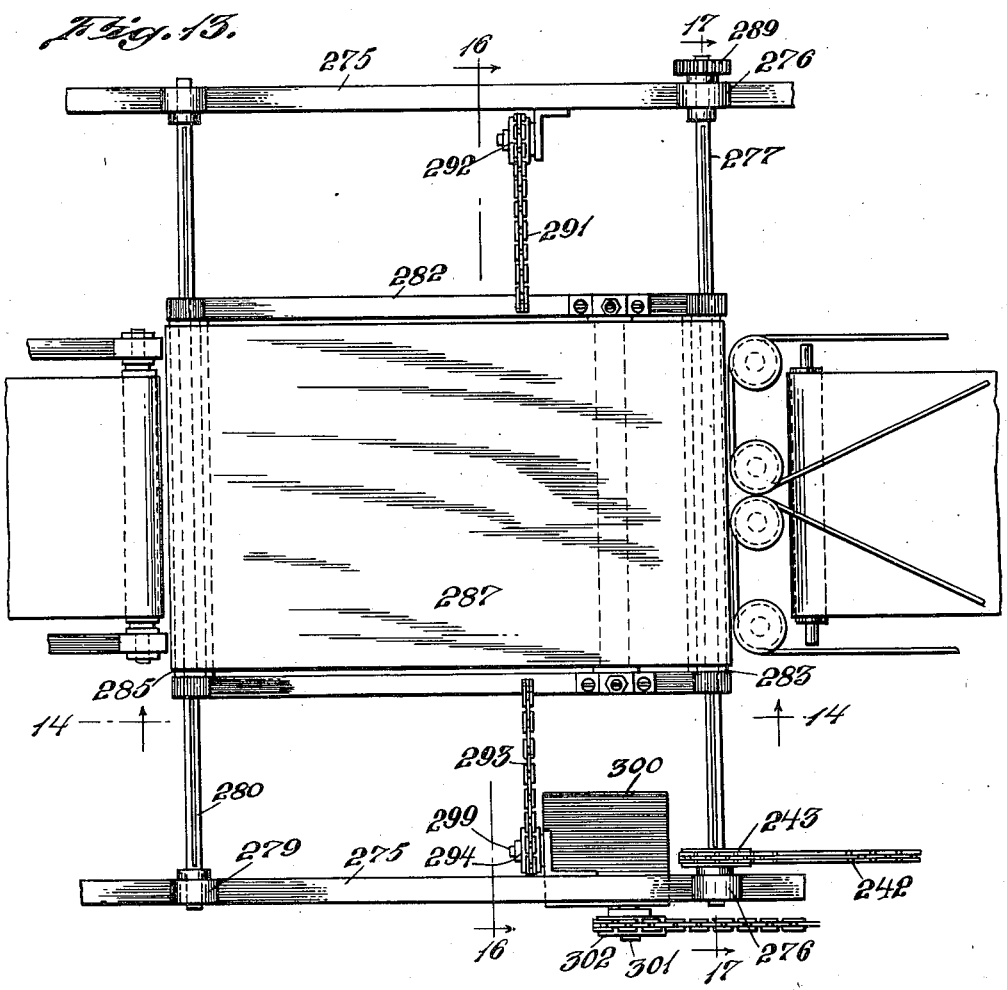
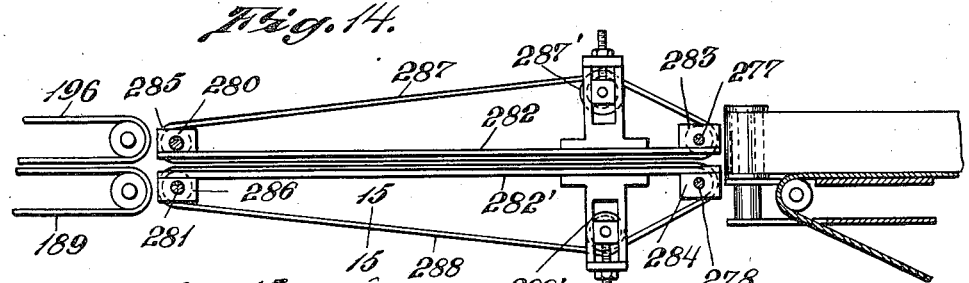
INVENTOR.
Nelson S. Campbell
BY Barlow & Barlow
ATTORNEYS.

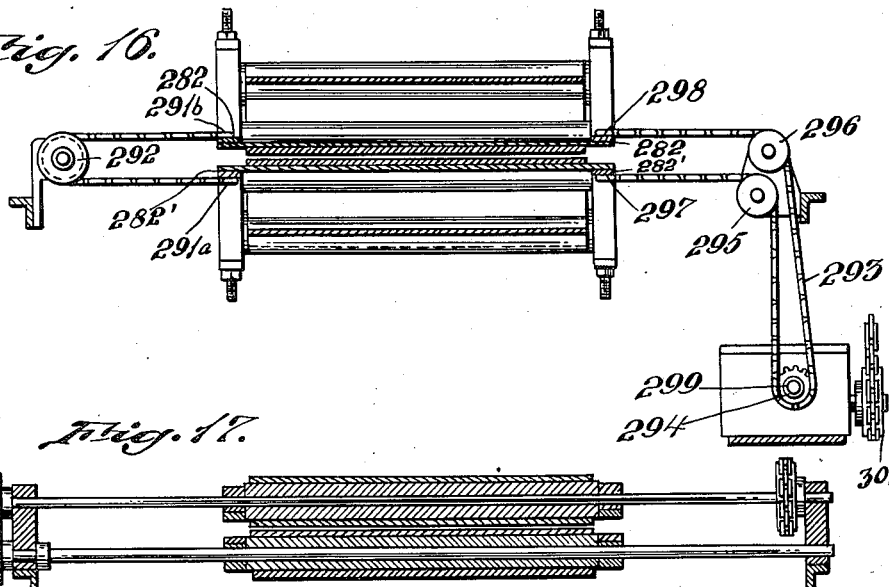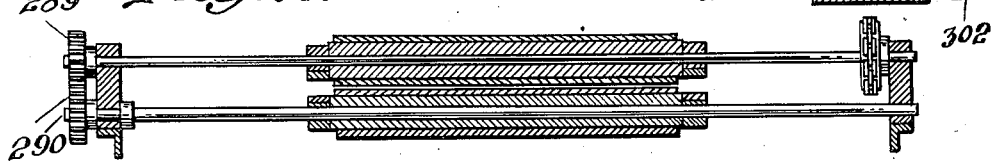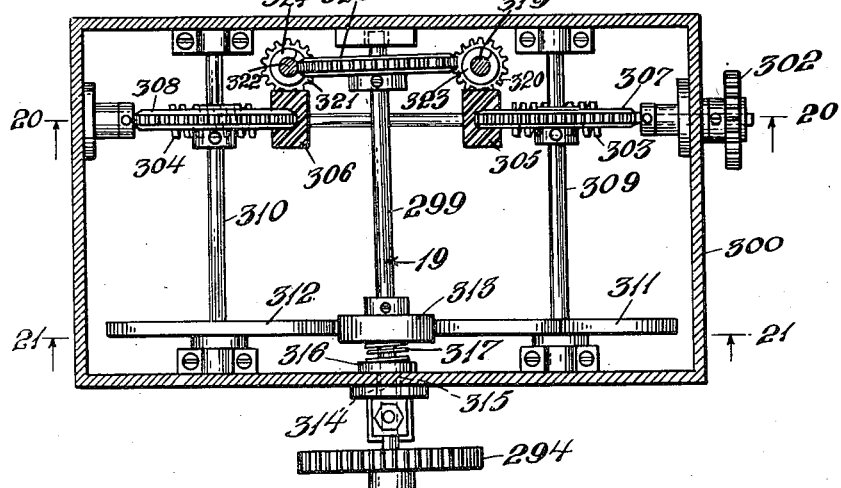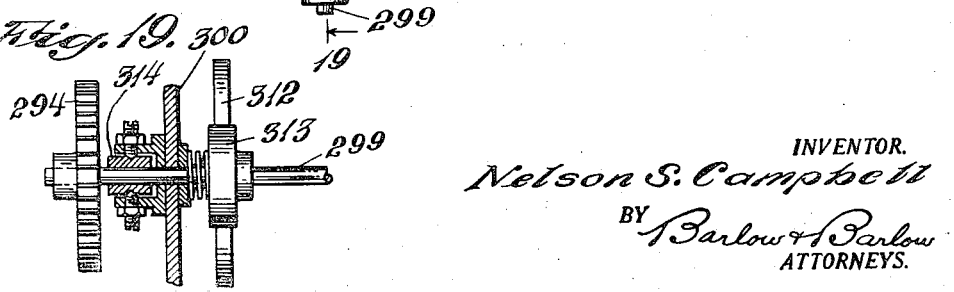

Sept. 1, 1942. N. S. CAMPBELL 2,294,771
STAPLE FIBER PREPARATION
Filed June 5, 1941 11 Sheets-Sheet 9

INVENTOR.
Nelson S. Campbell
BY Barlow & Barlow
ATTORNEYS.

Sept. 1, 1942.  N. S. CAMPBELL  2,294,771
STAPLE FIBER PREPARATION
Filed June 5, 1941  11 Sheets-Sheet 10

INVENTOR.
Nelson S. Campbell
BY Barlow & Barlow
ATTORNEYS.

Sept. 1, 1942.   N. S. CAMPBELL   2,294,771
STAPLE FIBER PREPARATION
Filed June 5, 1941   11 Sheets-Sheet 11

INVENTOR.
Nelson S. Campbell
BY Barlow & Barlow
ATTORNEYS.

Patented Sept. 1, 1942

2,294,771

UNITED STATES PATENT OFFICE 2,294,771

STAPLE FIBER PREPARATION

Nelson S. Campbell, Brookline, Mass.

Application June 5, 1941, Serial No. 396,676

12 Claims. (Cl. 57—1)

This application is a continuation in part of my copending application Serial No. 340,415, filed June 14, 1940 and a continuation in part of my copending application Serial No. 252,597, filed January 24, 1939.

This invention relates to formation of a staple fiber sliver by the treatment of a group of a large number of filaments in a form somewhat similar to the usual sliver except that each filament is in a form which is commonly called a "continuous length."

For convenience in this description, I will call the large number or group of continuous filaments, which are somewhat like a sliver, a "rope," although they have no twist. The filaments which are thus referred to are either natural, such as silk, or artificial, which at the present time are often referred to as synthetic filaments such, for example, as rayon, Celanese, Bemberg, or any others which may hereafter be developed. When these ropes are laid side by side and in contact either as one layer or as more than one layer with a combined width substantially greater than the thickness of the layer, I will call this mass of filaments a "web." The term "staple fiber" will be used for the filaments after being cut so as to form substantially equal lengths of fibers in the work. After the web has been changed in shape from a ribbon-like formation into a substantially round cross-section and is formed of staple fiber, I will refer to the product as "sliver" which may or may not have twist in it.

An object of the invention is the simplifying of the process of converting groups of continuous length fibers into slivers of spinnable length fibers by the elimination of one or more of the steps which it is customary to employ and thus causing a saving in both the machinery and labor in the final result obtained.

Another object of the invention is the maintaining of the filaments and fibers after being cut into staple length in a substantially undisturbed parallel relation so that it will be unnecessary to employ a carding, combing or straightening out operation on the staple fibers with a consequent damage to the individual fibers and waste of the material.

Another object of the invention is to provide such staple fiber sliver in a continuous process without the necessity of packaging any of the material prior to the formation of the staple fiber sliver in a ball or package arrangement suitable for further operations such, for example, as drafting.

Another object of the invention is to handle synthetic filaments which are of a rather wild and unruly nature by positively holding and controlling the filaments throughout the operations which are performed upon them.

Another object of the invention is the continuous moving of the work through the machine as distinguished from intermittent feeding and thus a more simplified machine and process for the feeding of the work than where step-by-step feed mechanism is necessarily employed.

A further object of the invention is to prevent the fibers from being nipped or caught in any of the conveying means.

A further and more specific object of the invention is to provide traveling means engaging the fibers and moving with the fibers through the apparatus and while moving to condense or change the work into the desired shape.

A further object of the invention is to so convey the work that it is subjected to little or no friction to oppose its forward travel while a condensing action takes place to crowd the filaments or fibers into a different arrangement as they proceed through the apparatus.

A further object of the invention is an arrangement which will receive the fibers in a mouth or opening larger than the width of the mass of fibers to be received and then quickly move the fibers without sliding of the fibers along some friction surface into a different relation as they are traveling forward.

Another object of the invention is to impart enough twist or false twist to the staple fiber sliver to package the sliver so as to make it possible to feed the sliver from the package to the next operation without licking.

Another more specific object of the invention is to so arrange the application of the false twist mechanism that false twist will positively be put in and held during packaging.

Another object of the invention is to twist or false twist the sliver by suitable movement of means which at the same time feed the sliver forward.

Another object of the invention is to twist the sliver by a rotation of a feeding means which nips the sliver and so holds the sliver at and beyond the point of nipping the sliver as to retain the twist placed in the sliver up to the point of nip.

A further object of the invention is to alternately rotate or oscillate the feeding means for twisting the sliver and to hold the twist put in the sliver by rotation or oscillation of feeding means in one direcion and to then allow the fibers freedom to receive additional twist by the opposite direction of rotation or oscillation.

A further object of the invention is to so drive the conveying means for the fibers during false twisting that a constant forward movement will be imparted to the fibers even though they are being revolved in one direction or the other direction.

A still further specific object of the invention is to place false twist in the sliver by oppositely reciprocating belts which roll the sliver and at the same time feed the same.

A still further object of the invention is to drive a feeding means and revolve the same about the axis of the sliver in opposite directions which would normally cause a difference in the driving speed of the feeding means dependent upon the direction of revolution, and to utilize the motion given to the alternate revolution of the feeding means for the fibers to cause a compensating movement for the transmission of drive to the feeding means to thereby move the fibers forward in the same direction at a constant rate regardless of the direction of rotation of the feeding means for the fibers.

With these and other objects in view, the invention consists of certain novel features of construction, as will be more fully described and particularly pointed out in the appended claims.

In the accompanying drawings:

Fig. 1 is a diagrammatic view largely in side elevation illustrating the various steps of operation upon the fibers as they emerge from the balls or tops of continuous lengths and are packaged in a staple fiber sliver form;

Fig. 2 is a top plan view of the apparatus shown in Fig. 1 with parts removed for clearness;

Fig. 3 is a schematic view illustrating the drive for the moving parts of the apparatus;

Fig. 6a is a central sectional view through the controller as shown in Fig. 5 with modified internal construction shown in Fig. 6 incorporated therein;

Fig. 6b is a transverse section across the axis of the construction shown in Fig. 6a;

Fig. 6c is a section on line c—c of Fig. 6a;

Fig. 7 is a central sectional view of the controller illustrated in Fig. 4;

Fig. 8 is a sectional view on line 8—8 of Fig. 7;

Fig. 9 is a sectional view on line 9—9 of Fig. 7;

Fig. 10 is a sectional view on line 10—10 of Fig. 7;

Fig. 11 is a sectional view on line 11—11 of Fig. 10;

Fig. 12 is a top plan view of the condenser;

Fig. 12a is a central section through the apparatus shown in Fig. 12;

Fig. 12b is a view similar to Fig. 12 but illustrating a modified arrangement of the aprons;

Fig. 12c is a section on line c—c of Fig. 12;

Fig. 13 is a top plan view of a different form of controller from that heretofore described;

Fig. 14 is a section on line 14—14 of Fig. 13;

Fig. 15 is a fragmental view illustrating one of the belts utilized and taken on substantially line 15—15 of Fig. 14;

Fig. 16 is a section on substantially line 16—16 of Fig. 13;

Fig. 17 is a section on substantially line 17—17 of Fig. 13;

Fig. 18 is a sectional view through the reversing gear mechanism;

Fig. 19 is a section on line 19—19 of Fig. 18;

Figure 4:
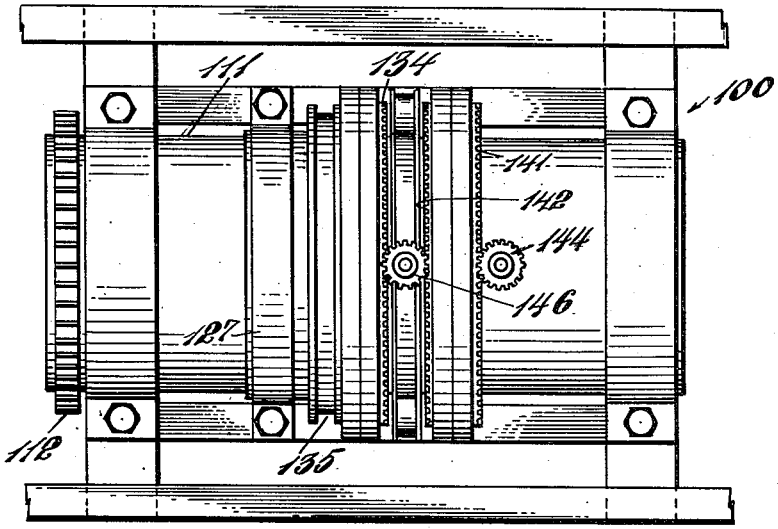
Fig. 4 is a top plan view of the controller portion of the apparatus with parts removed for the sake of clearness.

Heretofore, it has been usual to cut continuous length filaments into staple fibers in such a manner that it was necessary to pass the staple fibers through a carding machine in order to straighten out the fibers and arrange them in parallel relation; or it has been attempted to break continuous length filaments into staple fibers, but it has been found that the break will not occur sufficiently evenly along the length of the filament but rather the staple fibers are of such uneven length as to be unserviceable for high-grade sliver where predetermined even lengths of fibers are required. Then again in pulling fibers until they break, these fibers are caused to stretch which is injurious to the fibers and accordingly not entirely satisfactory.

Further, in working with synthetic fibers, it is found that these fibers are wild and unruly and have little cohesion one for the other. Therefore, they must be treated in a manner somewhat different from the natural fibers of wool or the like where such cohesion is much greater and the fibers will stick together. I also find that very little friction may be satisfactorily used to operate upon these synthetic wild and unruly fibers as they do not well respond to friction upon their surfaces and further that a twist or false twist is applied to the fibers with difficulty because of their very nature, and in order to avoid some of these difficulties, I have provided an apparatus to grip and control the fibers and feed them continuously through the apparatus while a knife operating obliquely to the line of travel of the work plane is caused to sever the fibers while these fibers are maintained in a generally parallel direction after which the sections of severed fibers are passed through a drawing operation and are then condensed into sliver form and falsely twisted. The condensing is performed by traveling aprons without any pinching of the fibers in their passage through the condenser and the false twist is put in the sliver in a new manner. Ordinarily, if a point in a running sliver is gripped and twisted while the sliver is slipping through the grip, the twist on the portion approaching the twisting point will be in one direction and the twist on the portion leaving the twisting point will be in the other direction so that if the end of the sliver is not turning, no twist actually results because what false twist occurs is neutralized except when the mechanism starts to reverse. I, however, will rotate the sliver in opposite directions but instead of holding the fibers at a single point for twisting, I will grip and hold the fibers through a substantial extent of feeding of the fibers while the gripping and holding means rotate the sliver to put in false twist and I so proportion and time the mechanism that the feed or travel of the sliver while held is equal to the time which it takes to revolve the sliver in one direction so that the twisting means will have the opposite movement to operate upon the twist of the sliver as it leaves the twisting means and thus will impart more false twist to the sliver instead of taking out the twist already put in, and I then package the sliver before an opportunity is afforded to relieve the false twist put in by a fast traversing package to lay the sliver at substantially right angles so that I have a package of a coherent sliver twisted sufficiently so that it may be drawn from the package without licking for further operation. These manipulations form a sliver which is in draftable form and may be directly put into an apparatus for further drawing without the necessity of passing the same through a card to straighten the staple fiber, thereby eliminating a great deal of waste and breaking of the fiber which has heretofore been occasioned, the same being accomplished with no opposing friction after the fibers are cut and accordingly a minimum amount of tendency to break the fiber as it is passed through the apparatus; and the following is a more detailed description of the present embodiment of this invention, illustrating the preferred means by which these advantageous results may be accomplished:

The apparatus consists essentially of a means for feeding the ropes into web form and thence through the various operations, a means for cutting the work obliquely or diagonally to the path of its travel through the apparatus, a drafting of the fibers in web form after cut, a condensing of the fibers into sliver form, and an imparting of false twist to the sliver and then packaging the same.

The general plan of this invention is to assemble several different units to cause the work to continuously flow through the different units where different operations are performed. The work as drawn from a source of supply is fed to a cutting operation in web form which operation is performed by a new apparatus which is described in considerable detail in my Patent No. 2,172,359, issued September 12, 1939, and from there is delivered to a unit for performing a drawing operation of a well-known form by mechanism available at the present time. From the drawing operation the work is passed through a dynamic funnel for condensing the fibers which is a new unit claimed specifically in my co-pending application Serial No. 292,680, filed August 30, 1939, and from there is passed into a controller for imparting false twist to the fiber which is also a new unit developed by me and may exist in either of two forms here shown, both claimed specifically in my co-pending application Serial No. 340,415, filed June 14, 1940, and the fiber is then packaged prior to any opportunity being afforded to untwist whereby it is in a form for further use.

With reference to the drawings, I have illustrated in Figs. 1 and 2 a supply 15 shown conventionally of continuous length synthetic filaments, such, for instance, as rayon ropes, although I do not limit myself to rayon, and which ropes may be drawn from a plurality of balls or other packages which are packaged in lengths of up to one thousand yards or the like. This supply may lead from several different balls through a pair of feed rolls 16, 17 and laid in a web form as at 18 in a trough 19 or, if desired, upon a traveling apron for conveying this web-like formation of continuous length filaments to a cutting apparatus which I will designate generally 20.

This cutting apparatus consists of a pair of receiving rolls 21, 22 and a pair of delivery rolls 23, 24. While between these two pairs of rolls there are helical cutters 25, 26 with shearing cooperating cutting ribs 27 and 28 which act upon the web to form an oblique cut 29 across the web. The drums 25 and 26 are so related as to apply sufficient pressure upon the web so as not only to feed it forward but also to prevent any sidewise movement of the web, due to the helical action of the shear upon the web, while the preventing of any such lateral movement is assisted by the pressure of the receiving and delivery rolls at either side of the point of the performance of the cutting act, the latter being sufficiently close to grip the severed fibers as a grip by the drums 25 and 26 is relinquished. This is all more fully described in my Patent No. 2,172,359, dated September 12, 1939, which I refer to herein for a fuller explanation of the details of this part of my apparatus. Surface speed of succeeding different pairs of rolls may be varied for different fibers and for straight or crimped fibers to provide the correct tension.

The web after being cut obliquely as at 29 is in the form of a plurality of parallelogram sections 30 extending one past the other and are fed to a drawing apparatus of some suitable type, such as, for example, a gilling machine designated generally 50 either by reason of the close proximity of the cutting device 20 thereto, or by a pair of traveling aprons 40 each embracing rolls 41 and 42, one of which is driven and which receives the web in the form of the cut sections 30 and delivers the web in this form to the receiving rolls 51 and 52 of the gilling apparatus.

This gilling apparatus is of a type well known in the trade and is adopted bodily into the flow line of the work for the performance of its customary function. It consists of intersecting upper faller bars 53 with pins 54 and lower faller bars 55 with pins 56, the pins of which extend into the work in intersecting relation to hold the cut staple fibers as they pass through the machine; that is, the bars are cam actuated into working position and fed forward by reason of the helically-grooved members 57, see Fig. 2. The delivery or drawing-off rolls 58 and 59 with apron are rotated at a surface speed greater than the travel of the needles or pins 54 and 56 so as to cause an attenuating action on the fibers as they are delivered through the rolls 58 and 59. I have not attempted to go into a detailed description of the gilling apparatus as the device alone is known. Up to this point, the web of staple fibers is in a flat ribbon-like formation and it is now desirable that it be condensed and a new unit is proposed in the apparatus for this purpose which I will refer to as a condenser, or dynamic funnel.

*The condenser*

The condenser consists of a bed plate 61 which supports two driving rolls 62 and 63 which are driven from a rotating part of adjacent apparatus, such as by means of sprocket gear 64, sprocket chain 65, sprocket gear 66, shaft 67, spiral gears 68 and 69, the latter of which is on shaft 70 of the roll 63. A gear 71 drives the corresponding gear 72 on the shaft of the roll 62 by intermeshing intermediate gears 73 and 74 in plan view in Fig. 12.

A belt 75 extends about the roll 62 and also about idler rolls 76 and 77 to dispose the belt in generally triangular formation with the work-engaging span 78 of the belt at an angle to the direction of movement of the work through the apparatus. A belt 79 extends about the pulley 63 and also about idler pulleys 80 and 81 which are mounted on one arm 82 of an L-shaped bracket 83 which has its other arm 84 pivoted as at 85 outside of the area enclosed by the belt 79. One work-engaging span 86 of this belt is likewise angularly disposed with reference to the direction of travel of the work so that both work-engaging spans of belts 78 and 86 form a V-shaped opening between them.

A convenient means of urging the aprons 75 and 79 together is provided and by reason of the pivotal mounting of the rolls 80 and 81 on the L-shaped bracket 83 the tension serves to swing the span 86 of apron 79 toward the span 78 of the other belt until the belts are in contact at the location of their pulleys 77 and 80, thus tending to squeeze any material which passes between these pulleys although allowing a swinging of the belt 79 away from the belt 75 at this location to accommodate varying amounts of work which may pass through or between these rolls. The inclined spans 78 and 86 of belts may be in some cases supported by back-up plates 92 which are mounted on brackets extending from the bed plate 61 for span 78 and from the arm 84 for span 86, one of these back-up plates for each of the spans above indicated being so located that if the tension of the belt is insufficient to hold the same taut against considerable pressure of the work, the back-up plates will assist in supporting this span of the belt for this purpose.

The usual depending apron which encircles the roll 59 of this gilling apparatus is designated 88 and instead of depending as usual is extended over an idler roll 89 and tensioned by roll 90 and supported by a plate above the bed plate 61. The span 91 of this apron is so located that it will be beneath the inclined spans 78 and 86 so as to support work which leaves the gills and passes between the delivery rolls 58 and 59 and enters between the converging belts 78 and 86 although it is short of the termination of these converging belts as idlers 77, 80 are beyond the end of this supporting belt.

In some cases it is desirable to provide the belts 75 and 79 only of a width sufficient to accommodate the thickness of the work which is to be passed through the condenser, and in this case I mount an upper apron 93 to engage the upper surface of the work as it travels through the condenser and assist in feeding the work therethrough. This apron encircles rolls 94 suitably driven from the gilling apparatus. One roll 94 is so placed that belt 93 will just clear roll 58 of the gilling machine, and thus any stray fibers which might extend upwardly will engage belt 93 to cause the fibers to enter into the condensing mechanism and prevent licking of the fibers about roll 58. This apron also serves to prevent any wild or unruly fibers from extending upwardly over the top edge of the spans 78 or 86 of the converging aprons and thus controls the condensing action more completely by reason of this apron above the work.

The work which is received from the gill in the form of a flat, ribbon-like web of greater breadth than thickness will be transformed into a rope-like sliver as it is delivered from the belts and through the rolls 77 and 80 to the false twisting apparatus designated generally 100.

In the modification illustrated in Fig. 12b, the usual belt 95 encircles the delivery roll 59 of the gilling machine, and the condenser which I have provided is a separate unit completely independent of the gilling machine unit. The parts of the condenser in the modified arrangement are the same as heretofore described with the exception of apron 88 of the heretofore described unit. In place of this apron 88, I provide an apron 96 which extends about a roll 97 mounted in bearings adjacent to the roll 59. The apron 96, however, will extend about the roll 89, and the other aprons of the mechanism of the condenser will be the same. This roll 97 is suitably driven from the gilling apparatus and in turn drives the roll 94 as shown in Fig. 12.

The triangular arrangement of the aprons permits the span which extends over and moves with the apron 88 to converge the fibers while the returning spans 78' and 86' are spaced clear of this apron and will not contact or wear on the same. As the spans 78 and 86 of the angular formation have a greater distance to travel than the straight line of the span 91 of the apron 88 or corresponding span of apron 93, these aprons will be caused to travel slightly faster to cause the vertical aprons and horizontal apron to travel at the same uniform speed which may be accomplished by reason of the constant angle to the direction of feed. By reason of the arrangement here provided the capacity for receiving and operating upon wide ribbon or web of work is had. Less licking of the fiber will be had by use of vertically disposed aprons.

The controller

After the web of fibers is condensed by the dynamic funnel just above described into sliver form 266, it is desirable that there be put into the sliver some false twist for the purpose of enabling the sliver to be led from one place to another and be packaged so that it may be fed off later without licking, and I pass sliver from this dynamic funnel directly into what I term "controller," here designated generally 100.

Under some conditions a controller such as I have illustrated in Figs. 13 to 17 may be used. This controller consists essentially of a pair of traveling aprons which receive the sliver 266 between the aprons and feed it through at a fixed speed. As the traveling aprons feed the sliver forwardly, they are reciprocated in opposite directions so as to roll the sliver between the aprons as it is traveling with them and impart a false twist to the sliver just before it enters the aprons and just as it leaves the aprons. During the time that the sliver is between the aprons and is being rolled, no twist is imparted to this portion of the sliver so held between the aprons. The length of time of reciprocation of the aprons in one direction is the same as the length of time for the feed of a point on the sliver through the aprons whereby the sliver is held against losing any false twist put in the sliver by the reciprocation of the aprons. Further twist is added when the sliver leaves the feed-holding aprons as these aprons will be reciprocated oppositely to add further false twist in the same direction when the sliver leaves the aprons.

The controller for accomplishing this result consists generally of a pair of traveling aprons to which power is applied to move the apron forwardly to feed the work and reciprocate the aprons oppositely. First, the aprons receive the sliver from the funnel or other previous mechanism and feed it through at a fixed speed. Second, they impart a false twist to the sliver which is held against untwisting by being conveyed between other aprons and then immediately packaged.

The general framework of the apparatus is designated at 275 consisting of two generally horizontal supports providing bearings at 276 for an upper shaft 277 and similar bearings for shaft 278 below it, while there are bearings 279 for shaft 280 and similar bearings for shaft 281 beneath it. The shafts 277 and 280 have a framework designated generally 282 slidably mounted upon them with rolls 283 and 285 in the frame 282 and on each of these shafts respectively, while a second separate frame 282' is slidably arranged upon the shafts 278 and 281, with rolls 284 and 286 within the frame and respectively slidably supported upon the shafts 278 and 281.

An upper belt 287 encircles the rolls 283 and 285 while the lower belt 288 encircles the rolls 284 and 286. These belts will be substantially in contact and provide a means for forwardly feeding the sliver which is received from the dynamic funnel to be fed through the belts to the conveying aprons 189 and 196. Each of these belts is maintained at the desired tension by a tension roll 287' and 288' which may be adjusted to desired position by any known means. The drive for forwardly feeding the aprons is through gear 289 and corresponding gear 290 beneath it, these gears being suitably driven from the shaft 240 in any convenient manner, as by sprocket chain 242, driving gear 243 on shaft 277.

From the above description it will be apparent that the frame 282 may be laterally reciprocated by sliding upon the shafts 277 and 280 while the frame 282' may be laterally reciprocated by sliding upon the shafts 278 and 281. In order that there will be a rolling action had by the aprons upon the sliver as it is fed forward, these frames with their belts will be reciprocated in opposite directions and will thereby cause a rolling of the sliver to cause twist to be put in at the head portion of the sliver where it enters between the aprons and twist to be put in the tail of the sliver as it emerges from the aprons. Reciprocation of a frame in one direction will be equal to the length of time that a point on the sliver requires to pass from the entrance of the nip of the rolls 283, 284 to its emergence from the nip of rolls 285 and 286, and during that time of passage the fibers will be held by the belts so that the false twist which is put into it cannot escape and thus false twist will be added to it as it emerges from between these aprons.

Each of the belts 287 and 288 is of leather and while the surface of this leather may under some conditions be suitable for sufficiently frictioning with the sliver to roll the same without sliding along the sliver, I have found that the rolling action of these belts may be improved by coating the surface with a latex product placed on the market under the trade-name "Vultex." A coating 327 (see Fig. 15) of this material will adhere to the leather belts and when allowed to harden will so grip the fibers of the sliver as to roll the same without any lost motion or sliding of the fibers and yet the fibers will not stick to the surface of Vultex thus formed. This material is flowed onto the surface of the aprons, buries the joint of the aprons, and may readily be patched if the aprons are scratched, due to some accident or other. This material before hardening is soluble in water and there is about 50 per cent of solids in the solution which is applied.

The material after flowing on may be left to dry in the air and may be applied either with or without a priming coat of latex. Latex, however, has some penetrating effect into the leather and serves to provide a little better adhering coating to the leather than when the coating is used without a priming coat of latex.

The reciprocating of these aprons 287 and 288 with the frames carrying them is accomplished by a strap 291 extending about the pulley 292 with one of its ends 291a attached to the lower frame 282' while its other end 291b is attached to the upper frame 282. A sprocket chain 293 extending about the sprocket gear 294 leads over suitable pulleys 295 and 296 with its ends 297 and 298 attached to the opposite sides of the frames 282 and 282'. Thus, oscillation of the sprocket gear 294 will cause opposite movements of the two frames. This sprocket gear 294 is mounted upon a shaft 299.

Figure 20:
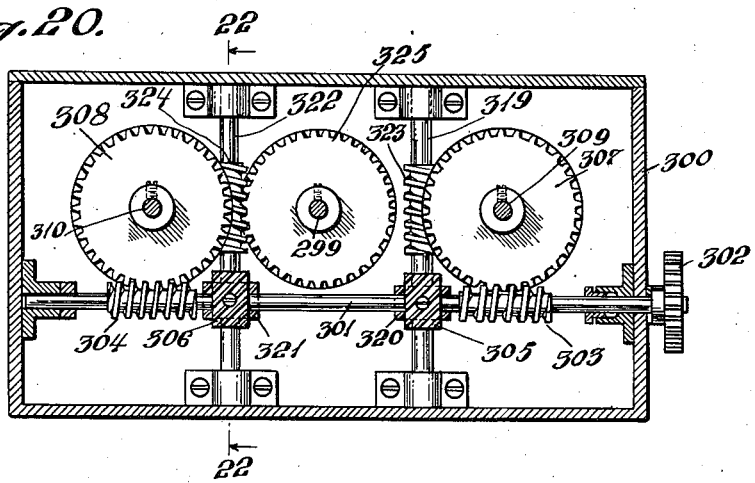
Fig. 20 is a section on line 20—20 of Fig. 18.
Figure 21:
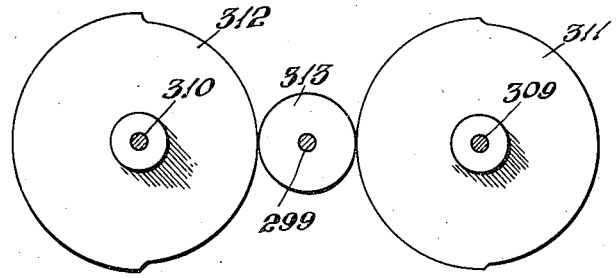
Fig. 21 is a section on line 21—21 of Fig. 18.
Figure 22:
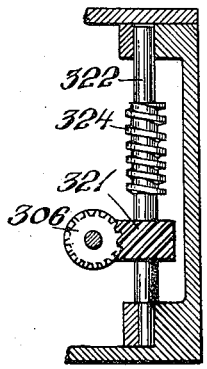
Fig. 22 is a section on line 22—22 of Fig. 20.

This shaft 299 is driven in opposite directions by means of the reversing mechanism within the gear box 300. (See in this connection Figs. 18, 19 and 20.) The main drive shaft 301 in this gear box is driven through gear 302, and there is fixed upon this shaft worms 303 and 304, also spiral gears 305 and 306. Worms 303 and 304 drive worm gears 307 and 308 on shafts 309 and 310 on each of which shafts there are mounted cams 311 and 312 which run in contact with cam follower roller 313 mounted upon shaft 299 which is rockably mounted by a suitable pivoted bearing 314 (see Fig. 19) supported on the casing, there being a slot 315 in the casing to permit of sliding movement of the shaft with reference thereto. A plate 316 is urged by spring 317 to maintain this opening closed for retaining such lubricant as may be contained within the casing and to prevent the entrance of foreign matter thereinto.

Spiral gear 305 drives the upright shaft 319 through spiral gear 320 on this upright shaft, while the spiral gear 306 drives spiral gear 321 mounted upon upright shaft 322. A worm 323 is fixed upon the shaft 319, while a worm 324 is fixed upon shaft 322, each of which is adapted to engage with and drive worm gear 325 fixed upon shaft 299 and which is alternately rocked by means of the cams engaging follower 313 from one side to the other back and forth to alternately engage worm wheels 323 and 324 and thus to impart alternate rotary motion to the gear 294 and to the frames 282 and 282'.

Lubricant may be contained in the casing 300 so that all of these gears may operate in a lubricant that their life may be prolonged and the operation quiet.

Figure 23:
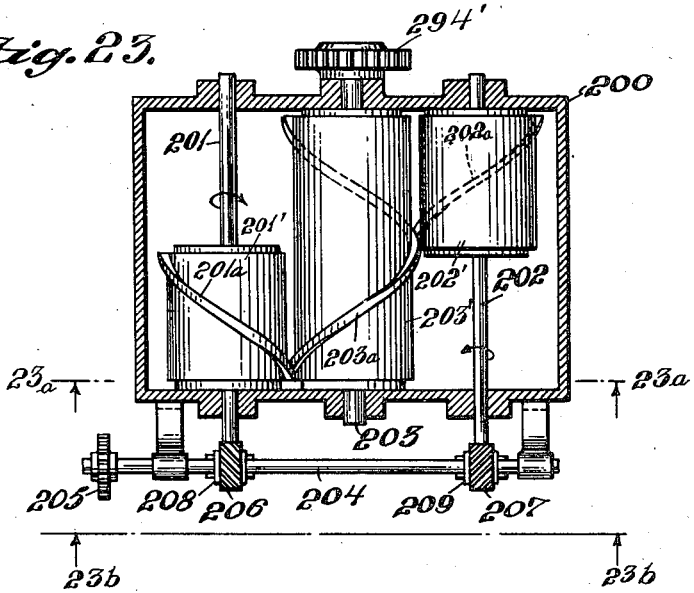
Fig. 23 is a view similar to Fig. 18 showing a modified form of reversing gear mechanism.
Figure 23A:
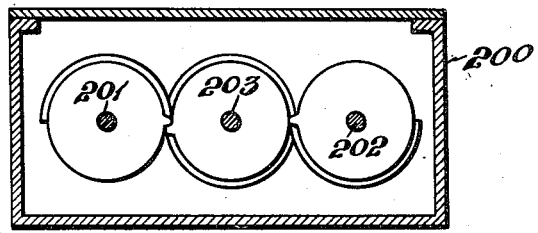
Fig. 23a is a central section of Fig. 23.
Figure 23B:
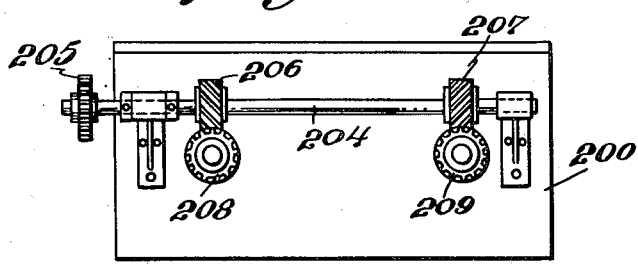
Fig. 23b is an end view of Fig. 23.
Figure 24:
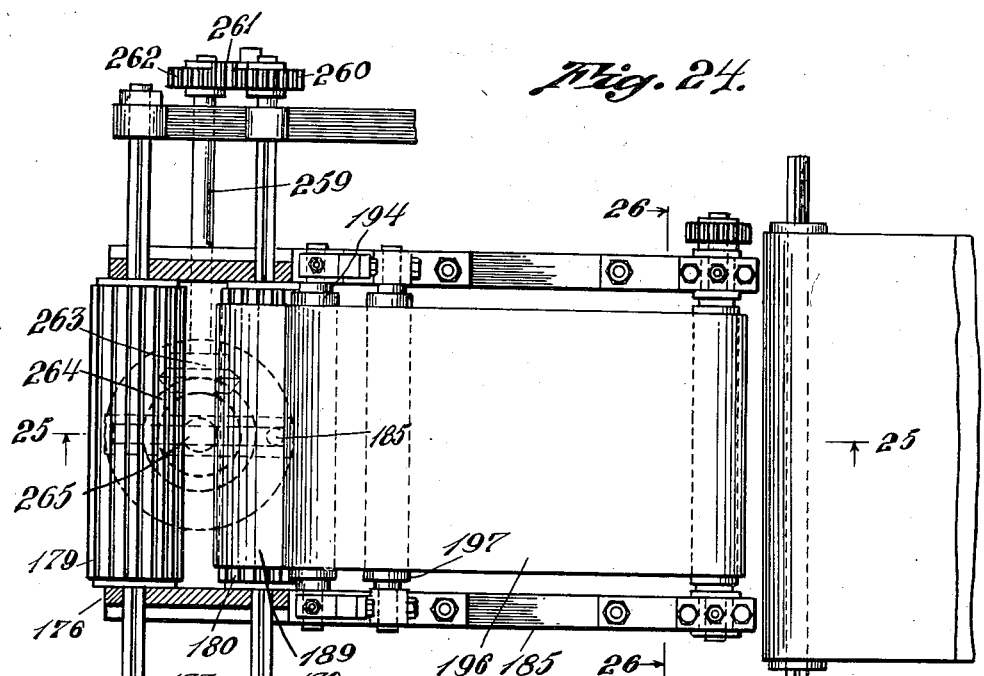
Fig. 24 is a top plan view of a portion of the packaging mechanism and illustrating the delivery end of the controller of Fig. 13.
Figure 25:
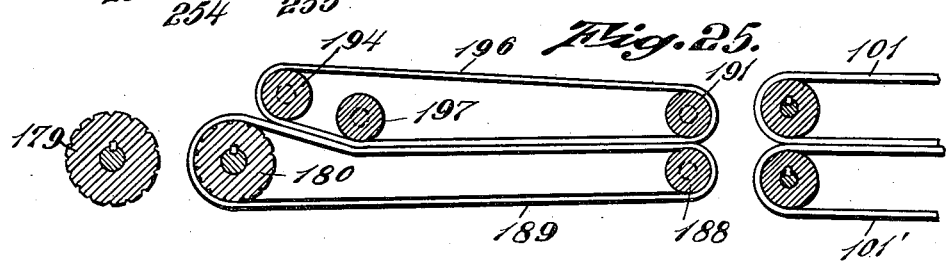
Fig. 25 is a schematic view on substantially line 25—25 of Fig. 24 illustrating the aprons for feeding the work.
Figure 26:
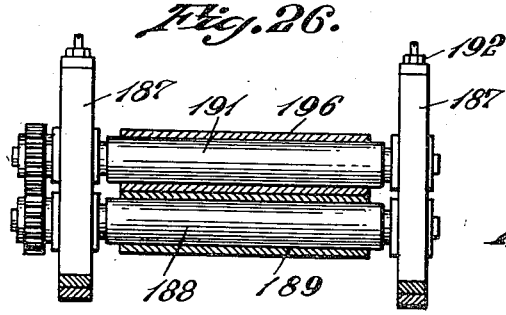
Fig. 26 is a section on line 26—26 of Fig. 24.

The particular type of reciprocating motion for the controller may be varied; in Fig. 23 I have illustrated a different arrangement, one which may be satisfactorily utilized under certain operating conditions and here I have illustrated a casing 200 in which there are fixed parallel shafts 201, 202, while between them there is a driven shaft 203. The shaft 204 has gear 205 fixed upon one of its ends which is driven from the shaft 240 by a suitable connection in the same manner as gear 302 would be driven from the shaft 240. This shaft 204 is equipped with opposite pitch spiral gears 206 and 207. Gear 206 meshes with spiral gear 208 on shaft 201 and gear 207 meshes with gear 209 on shaft 202 to oppositely drive these shafts. There is a cylinder 201' upon shaft 201 and a cylinder 202' upon shaft 202, each with a single helical tooth 201a and 202a extending about one-half of the drum thereon; while on shaft 203 between these shafts 201 and 202 there is a drum or cylinder 203' upon which there is a helical tooth 203a. The helical teeth 201a and 202a extend oppositely of the cylinders 201' and 202' one-half revolution, while the tooth 203a extends helically a complete revolution about the cylinder 203'.

As rotation occurs, tooth 201a will drive tooth 203a and cylinder 203' in one direction and, as the engagement of tooth 203a ceases at the end of a half revolution of the cylinder 201', the tooth 202a will come into engagement with the tooth 203a and drive cylinder 203' in the opposite direction until this tooth has expended its effort at the opposite end of the cylinder 202', whereupon the tooth 201a will again pick up the tooth 203a and again reverse the rotation of the cylinder 203'. Thus, there will be imparted to gear 294' opposite rotary motion.

The particular construction of controller is not vital to the flow line of the work through the machine; and as an alternate construction I have shown a different controller in Figs. 4 to 10 of the drawings. One form of this alternate type of controller is more complicated than the former one described but is more positive in its operation. This alternate controller consists essentially of a pair of traveling aprons 101 and 101', for example of leather, which receive the sliver 266 and feed it through at a fixed speed and which aprons are revolved about the center of the sliver as an axis to put into the sliver 266 before it enters between the traveling aprons some false twist. During the time the sliver is between the aprons, it is held so no twist is imparted to it. These aprons are revolved about the center of the sliver as an axis first in one direction and then in the other direction; the length of time during this revolution of the aprons about the work as a center in one direction is the same as the length of time for the feed of a point on the sliver through the aprons whereby the sliver is held against losing any false twist put in the head of the sliver by revolutions of the aprons in the same direction but operating upon the tail of the twist. Further twist is added when the sliver leaves the feeding holding aprons as these aprons will be revolving oppositely to add further false twist in the same direction as the sliver leaves the aprons. The controller for accomplishing this result is in general a pair of traveling aprons to which power is applied in two different ways inasmuch as their function is two-fold and each action must have its own drive. First, the aprons are to receive the sliver from the funnel, or other previous mechanism, and feed it through at a fixed speed. Second, they are to impart false twist to the sliver, which means that the whole assembly must be rotated first in one direction and then in the opposite way.

For convenience in applying the two drives, the apron assembly is mounted inside a cylindrical drum or piece of tubing, which is mounted in a pair of ball bearings because it must be held firmly, yet rotate easily. The two driving mechanisms are then applied on the outside of this drum. The alternating rotation is applied directly to the surface of the drum by gearing or other means. The drive for the aprons themselves, for the feeding through of the sliver, is supplied preferably by a belt at a fixed speed to a pulley carried on the drum by another ball bearing, so that it is free to move independently of the drum. The power is transmitted from this pulley through a rim gear indirectly to a pinion on a shaft which is mounted at right angles to the axis of the drum and goes through the wall of the drum to drive the aprons inside, through gearing, to produce the correct speed. The gearing which connects the power pulley to this pinion and its shaft will be described in detail later but, in general, it has to produce a compensation for the obvious effect the alternate rotation of the mounting of the pinion and shaft, first in the same direction as the power pulley and then the opposite way, would have on the speed of the feeding drive. It is clear that, without a compensating device, the aprons could not be driven at a steady speed. The difficulty comes from the rotation of the drum and apron mounting first with and then against the power pulley, so, to make the correction automatic for any speed, I use this same alternate rotation to produce the compensation, by reversing its effect and halving that effect where it works double. The mechanism for doing this will now be described.

A suitable support 102 is provided upon which there are mounted ball bearings designated generally 103 and 104; each of these ball bearings consists of an outer raceway 105 and 106 which is held fixed to the support 102 and an inner raceway 107 and 108 is supported through balls 109 and 110 and is fixedly secured to a cylindrical drum 111 which may freely rotate in these bearing supports at each of its ends. A gear 112 is also fixed to the cylindrical drum 111 which is engaged for imparting rotation in opposite directions to the cylindrical drum. Within the cylindrical drum 111 there is mounted a rectangular tube 113 by means of the end plates 113' which supports pairs of rolls 114 and 114' and 115 and its companion roll, not shown. The rolls 114 and 114' are at one end of the tube 113 and the rolls 115 and its companion roll are at the other end of the tube 113. An endless belt 101 passes over the two pulleys 114 and 115 and another endless belt 101' embraces the pulleys 114' and 115'. The pulley 114 is fixed in its mounting and the pulley 114' is so mounted in a slot 116' in the tube 113, that it will be urged toward the pulley 114 by springs 117. Pulleys 115 and 115' are in slots and are resiliently urged away from the pulleys 114 and 114' by means 119 to hold the belts taut.

These two pulleys 114 and 114' are geared together by gears 120 and 120' so as to rotate in unison and the pulley 114 is driven through the gear 121, motion being imparted to this gear 121 from the shaft 122 passing through the drum 111 and supported in the ball bearing 123, this shaft transmitting such motion by reason of the gears 124, 125 to the gear 121. The mechanism for driving shaft 122 will now be described.

A sleeve 126 is fixed by means of support 127 and extends along the cylindrical drum 111 and is free of the drum so that the drum may rotate relative to the sleeve. The sleeve in turn supports and has fixed to it the inner annual raceway member 130 of a ball bearing which has provided thereon an annular rim gear 131 which being fixed becomes in effect a rack. An outer raceway member 132 is supported through balls 133 and carries fixed to it a rim gear 134 on one side and a belt pulley 135 on the other side, the parts on opposite sides being in two sections held together by bolts 136 to bind the parts onto the outer raceway member 132. A similar construction comprising an inner raceway member 137 having a rim gear 138 thereon is fixed to the cylindrical drum 111, such for instance, as by a Woodruff key shown, while a companion outer raceway member 139 is supported by balls 140 and which outer raceway member has mounted thereon two rim gears one on either side designated 141 and 142; these are formed in two sections and are held together by bolts 143 suitably spaced about the annular periphery. The rim gear 141 meshes with the beveled pinion 144 fixed as by reason of the set screw 145 upon the shaft 122. The rim gears 142 and 134 are each in mesh with the bevel pinion 146, while the inner rim gears 131 and 138 are each in mesh with the bevel pinion 147. The bevel pinions 146 and 147 are mounted in an annulus which may revolve about the cylindrical drum 111.

The mounting of this annulus is best illustrated in Figs. 10 and 11. There is a channel-shaped member 148 fixed to the drum 111 with its side lips 149 extending outwardly from the drum. Two annular plates 150 and 151 are held in spaced relation to each other and also spaced from the channel member 148 by reason of ball bearing wheels 152, 152' which are mounted and held in fixed spaced relation on an axle 153 fixed in the plates 150 and 151, and as there are four sets of these wheels, see Fig. 10, the plates 150 and 151 are held in desired position and yet are free to rotate with reference to the drum while being prevented from movement axially of the drum. At certain desirable locations, preferably at diametrically opposite points for the sake of balance, I have mounted between these plates in a manner so that they will be carried by the plates the pinions 146 and 147. The plates are each cut out as at 153' and a U-shaped support 154 is secured as by pins 155 to the plates 150 and 151 between them which support provides a mounting for the trunnion pin 156 which in turn mounts the pinion 146. The plates are each also slotted as at 157 for the mounting of pinion 147, and here there is provided a U-shaped support 158 secured as by means of pins 159 to the plates 150 and 151, which support mounts the trunnion pin 160 for, in turn, supporting the pinion 147.

In order to provide a drive for the opposite rotation of the cylindrical drum 111, I may utilize one of the reversing mechanisms heretofore described, and shown in Figs. 18–20 or Fig. 23, such as encased in either the casing 200 or 300, the gear 294' or 294 extending from such casing being used for driving the gear 112 on the cylindrical drum 111. This gearing may be either direct or through idler pinions in order that the desired speed of rotation and reciprocation of the drum may be had.

The packaging device of any appropriate known form may be used. That shown is designated generally 175 which is but a skeleton showing of the movable parts involved and is modified from a known form to the extent of providing aprons to convey the work to it. The upright guide frame 176 is slidably mounted upon shafts 177 and 178, each of which slidably supports a fluted roll 179 and 180 to move along its own shaft with the guide frame, while the packaging roll 181 is guided in the groove 182 in the frame and may rise in this groove as the work accumulates thereon. It thus has the same speed of rotation regardless of its diameter. The frame 176 has rigid rearward extensions 185 secured to it which mount upright supports 186, 187. The rearward supports 187 provide bearings for the lower roll 188 about which and the roll 180 the lower apron 189 extends. These supports also provide adjustable bearings 190 for upper roll 191 which is slidingly urged toward the lower roll by some suitable means 192. The supports 186 provide adjustable bearings 193 for the upper forward roll 194 which is slidingly urged toward the apron 189 by some suitable means 195. An apron 196 embraces the rolls 191 and 194 and any slack of this apron or the lower apron 189 is taken up by roll 197 which is adjustably mounted in the support 186. The entire frame 176 with its extensions 185 and aprons 189 and 196 is traversed by means of a disc secured to the lower part of the frame. A slot 182' is provided in the under surface of the disc to receive the crank pin 183, carried by the rotatable member 184.

*The drive*

The drive for my apparatus may be varied as will be readily understood. I have, however, illustrated one arrangement. Referring more particularly to Fig. 3, I have illustrated schematically the drive of the various moving parts of this apparatus all from a single power shaft 210 driven by pulley 211 from which motion is transmitted to the delivery roll 24 of the cutting unit through a train of gears 212, 213, and 214 thence through shaft 215 to other rotating members as 26 and 22 of the cutting unit by beveled gears 216, 217, shaft 218, beveled gears 219, 220, 221, 222 and to lower feed roll 17 by bevel gears 223 and 224. The traveling aprons 40 are rotated from shaft 215 through gears 225, 225' and 226.

Forwardly from the main drive shaft 210 motion may be transmitted to shaft 227 by gears 212, 228 and from this shaft by sets of beveled gears 229 and 230 to the helical slotted members 57 for the faller bars. Drive is also taken from this shaft 227 for the receiving roll 52 on shaft 231 driven through the train of gears 232, 233, 234, 234' and 235. The delivery roll 59 of the gill box may be driven from the shaft 227 by gears 236, 237, 238, 239, and shaft 240 upon which it is mounted.

From the shaft 240 drive is taken for the dynamic funnel by means of gears 240' and 240" to the reduced trunnion of roll 94 and by means of the gear 64, chain 65, gear 66, shaft 67, spiral gear 68, spiral gear 69 on shaft 70 for the other aprons; the further drive of the dynamic funnel from this point has been explained. The drive for the feed of the controller is taken from the shaft 240 by means of the gear 241, sprocket chain 242, and gear 243 on shaft 277, or a belt may drive pulley 135 from some suitable source of rotation. The drive for the reciprocation of the controller is taken from shaft 240 by means of gear 245, sprocket chain 246, gear 302, to gear box 300 which imparts reciprocating motion, as above explained, to the gear 294 and sprocket chain 293 for feeding belts 287 and 288 driven about the rolls 283, 285, or to gear 112 (see Fig.

4) by suitable transmission from a gear box such as above described.

Motion is also taken from shaft 240 to the packaging unit by means of gears 252, sprocket chain 253 to sprocket gear 254 which is on shaft 178 which in turn drives shaft 177 through gears 255, 256, 257 while the traversing motion is caused by shaft 259 driven by gears 260, 261, 262, and operates the crank 183 by beveled gears 263, 264, the latter of which is on the vertical shaft 265. In this manner it will be apparent that the entire apparatus is arranged to be driven synchronously through all of the parts operating in a certain definite timed relation. Further details of the operation will now be described.

The belts 287, 288 are reciprocated (or, if the drum 111 is used, it is rotated in first one direction and then in the opposite direction) for imparting of false twist to the work. Some false twist is imparted at the point between the delivery of the work from the dynamic funnel and its entrance between the belts of the controller twisting the leading end of any given section of sliver. As motion occurs in one direction, twist is put into the work as it is fed forward, and this twisted work is gripped by the aprons and held against any further twist or untwisting as long as it is between the aprons. The period of time that any one point of the work travels through the aprons and thus is gripped and held within the aprons will be the period of time of twisting between the dynamic condenser and the controller. As the work emerges at 265 (see Fig. 2), the controller will be moving in the opposite direction from that when twist was first put in at 266 and, therefore, additional false twist will be put in the work because the rolls will operate upon the back end of the said given section of sliver and the sliver will then be packaged before there has been any chance for a loss of the twist. This holding of the work so that it cannot be untwisted during the period of rotation in one direction enables me to put in further false twist rather than to extract a false twist already put into the work as happens with a twisting mechanism which holds the sliver at only one point.

The controller consisting of the reciprocating aprons will receive the sliver from the funnel and by reason of their forward driving motion feed the sliver between them. As this sliver is fed forward by these aprons, the aprons 287, 288 will oppositely reciprocate so as to roll the sliver and impart false twist to the sliver as it enters the aprons and also to the sliver as it emerges from the aprons. During the time that the sliver is between the aprons and being rolled, no twist is imparted to this portion of the sliver held between the aprons, and as each portion of the sliver receiving twist is fed into the aprons, the twist is held in the sliver and thus, the false twist imparted is held in the sliver as it passes through the aprons while, when it emerges from the aprons, the aprons have changed their direction of reciprocation so that more twist is put into the sliver as it leaves the controller and then the sliver is directly engaged by the traveling aprons 189 and 196 and moved to the balling device before any of the false twist has an opportunity to escape.

Should use of the alternate controller be made, and if I assume that the drum 111 is stationary, motion from the belts 242 will be transmitted through the pulley 135 and rim gear 134 which rotates therewith through the pinion 146 to rim gear 142 and rim gear 141 traveling therewith, thence to bevel gear 144, shaft 122, gears 124, 125, and 121 to the driven pulley 114 and through gears 120 and 120' to driven pulley 114'. The situation which I have just assumed is one which occurs in the operation of the device only momentarily at the time of reversal of rotation of the cylindrical drum 111 which is revolved first in one direction and then in the opposite direction. Accordingly, a problem for driving the aprons 101 and 101' continuously at a uniform speed is presented as the drum is rotated in opposite directions to prevent an increase or decrease of the drive for the aprons. I have accomplished this drive by a compensating device whereby the rotation of the drum will not affect the driving of these two endless aprons, by causing a compensating differential movement to be actuated by the rotation of the drum itself for effecting this result.

There will of course be rotation between the pinion gear and the gears with which the pinion meshes dependent upon the relative number of teeth on the gear and pinion, but for the purposes of illustration the turning effect of the revolutions of the drum about the axis of the work as the center of the pinion gears will demonstrate the results accomplished, and for illustrative purposes I will arbitrarily assume that the pulley 135 is driven six turns a second and that the member 200 causes a rotation of the drum 111 about the axis of the work as the center four turns in a second in one direction and then four turns in the next second in the other direction, alternatingly. If I assume that the direction of rotation of the drum 111 is against the rotation of the pulley 135, I would have if the rim gear 134 were engaging directly with the gear 144 an increased turning effect on the gear 144 which would be equivalent to the sum of six turns of the pulley 135, and consequently rim gear 134, plus the turning effect of four revolutions of the drum 111 which would make a total equivalent to the turning effect of ten revolutions of the rim gear 134 upon the shaft 122, if the shaft 122 were stationary, and it would be clear that under these same circumstances if the rotation of the drum 111 were with the pulley 135, we would have, if the rim gear 134 were engaging directly with the gear 144, a decreased turning effect on the gear 144 which would be equivalent to the six turns of the pulley 135, and consequently rim gear 134 minus the turning effect of the four revolutions of the drum 111 which would make a total equivalent to the turning effect of two revolutions of the rim gear 134 upon the shaft 122, if the shaft 122 were stationary. The correction must be made so that the drive or revolutions of pulley 135 are so transmitted that the equal of six effective revolutions of the pulley 135 are transmitted to the gear 144; that is, the low speed plus the effect of four revolutions must equal the high speed minus the effect of four revolutions which in both cases must equal the effective speed of the pulley 135. I arrange that compensation will be caused by the drum 111 to exercise a force upon the driving mechanism for the aprons. I accomplish this result by utilizing the alternating rotation of the drum to produce through an intermediate pinion a variable speed on rim gears 141 and 142 in a direction opposite to that of the pulley 135. This action is explained more fully later.

When the drum 111 is rotated four revolutions a second opposite to the direction of rotation of the pulley 135 which has six revolutions a second, the member 137 is causing the annulus carrying pinion 147 to revolve in the same direction as the rotation of the drum 111, but by reason of the fixed rim gear 131 which practically becomes a rack, the pinion will travel just half as fast about the axis of the work as a center, as the drum or member 137 rotates or, instead of making four revolutions, it and the plates 150, 151 in which it is mounted will make two revolutions a second. This motion of the plates 150 and 151 which carry the pinion 146 which transmits motion from the rim gear 134 driven directly with the pulley to the gear 142, inasmuch as it is traveling in the direction of the drum and which is against the direction of the pulley, will cause additional turning effect to be transmitted through the pinion 146 from rim gear 134 to rim gear 142 but driving it in opposite direction to that of pulley 135.

To determine the value of the additional turning effect, I must consider two factors. Assume that the pulley 135 and the gear 134 were stationary and the annulus rotated two revolutions per second carrying the pinion 146 with it, then the turning effect of two revolutions of the pulley 135 would be applied to the pinion 146 to rotate the pinion about its center trunnions 156 and this additional turning effect would be applied to the rim gear 142. Further, if the annulus freely rotated two revolutions per second and the pinion 146 were stationary, there would be given to the rim gear 142 with which pinion 146 meshes the effect of two revolutions per second. Thus, the total additional turning effect is 2+2 revolutions or when the six revolutions of the pulley 135 is included in the sum, I have 6+2+2=10 as the turning effect in revolutions which is transmitted to the gear 142 and consequently to the pinion 144. Now, inasmuch as the pinion 144 is carried in the same direction as the rotation of the member 139 and rim gear 141, the turning effect upon the bevel gear 144 will be the turning effect of the ten revolutions of the rim gear 141 minus the turning effect of four revolutions of the bevel gear 144 (10—4=6), or the turning effect of six revolutions so that the pulley 135 will have transmitted to the bevel gear 144 the turning effect of six revolutions per second on the bevel gear 144.

Now assuming the same numerical revolution but that the drum 111 is turning in the same direction as the pulley 135, then the member 137 is causing the annulus carrying pinion 147 to revolve in the same direction as the rotation of the drum 111, but by reason of the fixed rim gear 131 which practically becomes a rack, the pinion will travel just half as fast about the axis of the work as a center, as the drum or member 137 rotates or, instead of making four revolutions, it and the plates 150, 151 in which it is mounted will make two revolutions a second. This motion of the plates 150 and 151 which carry the pinion 146 which transmits motion from the rim gear 134 driven directly with the pulley to the gear 142, inasmuch as it is traveling in the direction of the drum and which is also the direction of the pulley will cause less turning effect to be transmitted through the pinion 146 from rim gear 134 to rim gear 142.

To determine the value of the less turning effect, I must consider the above two factors. Assume that the pulley 135 and gear 134 were stationary and the annulus rotated two revolutions per second carrying the pinion 146 with it, then the turning effect of two revolutions of the pulley 135 would be applied to the pinion 146 to rotate the pinion about its center trunnions 156 and this less turning effect would be applied to the rim gear 142. Further, if the annulus freely rotated two revolutions per second and the pinion 146 were stationary, there would be given to the rim gear 142 with which the pinion 146 meshes the effect of two revolutions per second. Thus, the total less turning effect is —2—2 revolutions or, when the six revolutions of the pulley 135 is included in the total, I have 6—2—2=2 as the turning effect in revolutions which is transmitted to the gear 142 and consequently to the pinion 144. Now, inasmuch as the pinion 144 is carried in the same direction as the rotation of the member 139 and rim gear 141, the turning effect upon the bevel gear 144 will be the turning effect of four revolutions of the bevel gear 144 (2+4=6), or the turning effect of six revolutions per second on the bevel gear 144. It will thus be seen from a comparison of these two assumed directions of rotation of the drum 111, the motion transmitted to the shaft 122 will be the same and thus the endless aprons 101 and 101' would travel in the same direction and at the same speed as operated by the pulley 135 regardless of the alternate directions of rotation of the drum 111.

Figure 5:
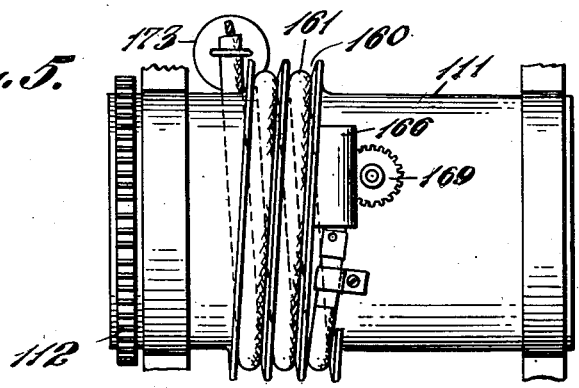
Fig. 5 is a top plan view of a modified form of drive for the controller and showing the controller modified to the extent necessary for the modified drive.
Figure 6:
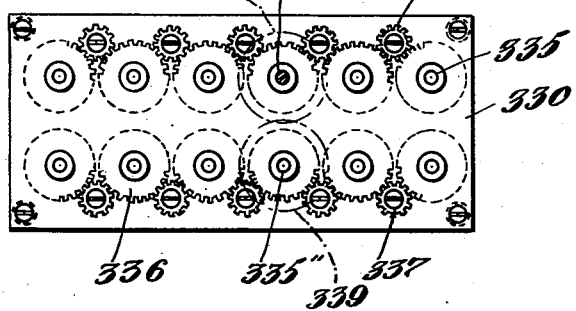
Fig. 6 is a plan view of the unit of a modified construction in the inside of my controller.

In Figs. 5 to 6c, I have illustrated a modified form of controller drive in which, instead of using the compensating mechanism heretofore described, I use a helically formed groove or track 160, formed about the drum 111. Within this groove 160, a flexible shaft 161 is provided, which will receive its driving rotation from some suitable location on the apparatus such, for instance, as from shaft 240 from which the drive for the controller aprons has been taken. This flexible shaft 161 is wound about the drum helically and is of sufficient length and position of wrap about the drum so that the drum may be turned the necessary amount by the gear 112 in its opposite rotation of the drum. The end of this shaft 161 is connected through a universal joint 162 (Fig. 6c) to a short shaft 163 mounted in ball bearings 164, 165 in a cylindrical portion 166 cast integral with the casing 111 in the form shown in Fig. 5 and bored out for the reception of the ball bearings and retaining portions 167. This shaft 163 has a worm 168 thereon. This worm engages a worm wheel 169 which is mounted on a shaft which extends through the cylinder 111 and which is designated 122 and is the same shaft upon which gear 144 is mounted in the first described construction. Shaft 122 is mounted in a ball bearing 123 suitably in a bored boss 170 extending from the case. This drive which I have illustrated may be applied to the drive of the endless aprons 101 and 101' heretofore described and is of much simpler construction. A weight 173 may be suspended on the flexible shaft to drop as the shaft unwinds and thus take up the slack which is formed.

Although I have shown aprons within the controller, in some cases I may desire to use conveyor rolls closely positioned within the controller and which may be inserted within the cylindrical drum 111 suitably prepared therefor as a single unit. In the drum 111 as shown in Figs. 6a and 6b inward projections 171 are provided and also a set screw 172 extending through the wall of the drum.

The unit for insertion of the drum (Figs. 6 to 6c) consists of a pair of plates 330 and 331 spaced by tubes 332 surrounding bolts threadingly holding the plates together in fixed relationship.

Between these plates there are conveyor rolls 333 arranged in pairs, each pair being driven and gripping the work and advancing it through the controller. The rolls of each pair are a fixed distance apart predetermined by the capacity of the machine and variable by changing the diameter of the rolls or the unit itself. The plurality of pairs of rolls provide two aligned rows or rolls with the rolls in each row similarly rotated. These rolls are each mounted in ball bearings 334 at each end and are in fixed relation to a shaft 335 extending through the plates and through the rolls for the driving of these rolls. Upon one end of each shaft there is a gear 336. The gears in each row are connected together by intermediate idler gears 337 so that all the gears in each row will operate alike. Shaft 122 is connected to drive one of the shafts 335 which I have designated 335' (see Figs. 6 and 6b) and this shaft provides the drive for all of the rolls in one line. At the other end of this shaft 335', I have provided a gear 338 meshing with the gear 339 on the shaft of the roll paired therewith which shaft is designated 335'' (see Figs. 6 and 6b) so that all of the rolls on the other row of the rolls will be driven through their gears 336 and their pinions 337. Thus, a positive drive is afforded to each of the rolls in each line that these rolls will rotate at an equal rate of revolution.

These rolls are each fluted, as will be seen in Fig. 6a, and are close together to afford a conveyance of the fibers with a partial false twist therein through the controller. It will, of course, be apparent that this unit of rolls may be utilized with either drive for the drum as heretofore described.

After the work leaves the controller, it is conveyed by the aprons 189 and 196 to the packaging apparatus and, as these aprons and the packaging apparatus are laterally traversed together, the sliver will be laid between the aprons 189 and 196 in a sinuous path. Therefore, the surface speed of the aprons will be slightly less than the surface speed of the feed aprons or rolls of the controller, the difference being commensurable with the take-up of the sinuosity of the work between the aprons. This is somewhat different from the general arrangement through the machine where each succeeding conveyor apron, as the work progresses through the machine, usually has slightly greater surface speed so as to cause some little tension to be applied to the work.

This flexible shaft arrangement of the controller is a much simpler form of apparatus than that previously described and thus one simple to manufacture.

From the above, it will be clearly apparent that I have provided a satisfactory operating apparatus for the continuous flow of work from the rope form into spinnable staple fiber sliver form without the necessity of packaging or handling the work in any manner from the receiving of the same to the delivery, and I have imparted false twist to the work sufficient to prevent a licking of the sliver as it is drawn from the package for further operations. The sliver, while having several operations performed upon it, is not subjected to friction or other detrimental disturbing elements which are sometimes existent in the working of textile fibers.

I claim:

1. The process of producing staple fiber sliver from filaments of long length which consists in feeding the filaments in a continuous flow in parallel contiguous relation, and submitting the filaments to the successive operations of cutting, condensing, false twisting successive stretches in opposite directions and packaging in a form suitable for the next operation while preventing substantial escape of the false twist.

2. The process of producing staple fiber sliver from filaments of long length which consists in feeding the filaments in a continuous flow in parallel contiguous relation, and submitting the filaments to the successive operatings of cutting, condensing, false twisting and packaging in a form suitable for the next operation while preventing substantial escape of the false twist, said filaments being engaged between oppositely disposed control means spaced lengthwise of the travel of the filament at intervals to at all times control the work fibers.

3. The process of producing staple fiber sliver from filaments of long length which consists in feeding the filaments in a continuous flow in parallel contiguous relation, and submitting the filaments to the successive operations of cutting, condensing, false twisting and packaging in a form suitable for the next operation while preventing substantial escape of the false twist, said filaments being engaged on opposite sides by traveling feeding means spaced lengthwise of the travel of the filament at intervals to at all times control the work fibers.

4. The process which consists in feeding in a continous flow filaments of long lengths in parallel contiguous relation providing a web-like form, cutting the web to provide staple fibers, drawing said fibers, condensing the drawn web into sliver form, imparting a relative twist to the fibers in successive stretches in opposite directions and then reeling the relatively twisted sliver into a ball or other form suitable for the next operation.

5. The process which consists in feeding in a continuous flow filaments of long lengths in parallel contiguous relation providing a web-like form, holding the web against sidewise movement and cutting the web obliquely to provide staple fibers, drawing said fibers, then condensing the drawn web into sliver form and imparting a relative twist to the fibers in successive stretches in opposite directions and then reeling the relatively twisted sliver into a ball or other form suitable for the next operation.

6. The process which consists in feeding in a continuous flow filaments of long lengths in parallel contiguous relation providing a web-like form, cutting the web to provide staple fibers, drawing said fibers, then condensing the drawn web into sliver form, imparting a false twist to the fibers in successive stretches in opposite directions and then reeling the falsely twisted sliver into a ball or other form suitable for the next operation while preventing escape of the false twist in the sliver.

7. The process which consists in feeding in a continuous flow filaments of long lengths in parallel contiguous relation providing a web-like form, holding the web against sidewise movement and cutting the web obliquely to provide staple fibers, drawing said fibers, then condensing the drawn web into sliver form and imparting a false twist to the fibers in successive stretches in opposite directions and then reeling the falsely twisted sliver into a ball or other form suitable for the next operation while preventing escape to the false twist in the sliver.

8. The process of forming workable sliver, suitable for drawing and spinning, directly from continuous filaments of long lengths which process comprises positively and continuously feeding a web-like mass of such filaments, in generally parallel contiguous relation, in a lengthwise direction, positively gripping said filaments not only to advance them but to at the same time prevent their lateral movement and, while so gripped and advancing, cutting said mass of filaments obliquely to their line of travel to provide staple fibers of substantially even length, then engaging and feeding the cut sections of staple fibers to a drawing operation while maintaining the fibers in substantially parallel position and then condensing the web delivered by the drawing operation to sliver form, giving the sliver false twist in opposite directions in successive stretches and putting the sliver in a ball or other form suitable for the next operation.

9. The process of forming workable sliver, suitable for drawing and spinning, directly from continuous filaments of long lengths which process comprises positively and continuously feeding a web-like mass of such filaments, in generally parallel contiguous relation, in a lengthwise direction, positively gripping said filaments not only to advance them but to at the same time prevent their lateral movement and, while so gripped and advancing, cutting said mass of filaments obliquely to their line of travel to provide staple fibers of substantially even length, then engaging opposite sides of and feeding the cut sections of staple fibers to a drawing operation while maintaining the fibers in substantially parallel position, and then condensing the web delivered by the drawing operation to sliver form, engaging opposite sides of the sliver and giving the sliver false twist in opposite directions in successive stretches while so engaged and putting the sliver in a ball or other form before escape of said twist suitable for the next operation.

10. An apparatus for staple fiber preparation comprising successive means for cutting, condensing, false twisting and packaging in which the placing of false twist in staple fiber sliver comprises aprons for feeding the sliver forward and mechanism to so move said aprons as to, while holding the sliver, revolve the same about an axis within itself first in one direction and then in the other direction to put false twist in the portions of the sliver adjacent to said aprons, and means for holding the false twist so imparted to the fibers.

11. An apparatus for forming workable sliver suitable for drawing or spinning, comprising means for feeding a web-like mass of continuous filaments in generally parallel contiguous relation, means for positively gripping said filaments, means for cutting said filaments obliquely to their line of travel while moving forward and so gripped into substantially even lengths, a drawing means for attenuating the section of the cut fibers while maintaining them in parallel relation, means for condensing the drawn fibers into a sliver, and means for imparting false twist to the sliver first in one direction and then in the other direction and packaging the same to hold the false twist imparted thereto.

12. An apparatus for forming workable sliver suitable for drawing or spinning, comprising means for feeding a web-like mass of continuous filaments in generally parallel contiguous relation, means for positively gripping said filaments, means for cutting said filaments obliquely to their line of travel while moving forward and so gripped into substantially even lengths, traveling belts for forwardly feeding the cut fibers, a drawing means for attenuating the section of the cut fibers while maintaining them in parallel relation, means for condensing the drawn fibers into a sliver, traveling belts for imparting false twist to the sliver, traveling belts to again feed the fiber, and means for packaging the same.

NELSON S. CAMPBELL.